United States Patent [19]

Matsui

[11] 4,439,896
[45] Apr. 3, 1984

[54] CLAMP FOR A BUNDLE OF CABLES

[75] Inventor: Kazuhiro Matsui, Toyoake, Japan

[73] Assignee: Kitagawa Industries, Co., Ltd., Aichi, Japan

[21] Appl. No.: 385,397

[22] PCT Filed: Sep. 21, 1981

[86] PCT No.: PCT/JP81/00249
§ 371 Date: May 20, 1982
§ 102(e) Date: May 20, 1982

[87] PCT Pub. No.: WO82/01459
PCT Pub. Date: Apr. 29, 1982

[30] Foreign Application Priority Data

Oct. 9, 1980 [JP] Japan .................................. 55-141398

[51] Int. Cl.³ .......................... B65D 67/02; F16L 3/08
[52] U.S. Cl. ................................. 24/16 PB; 248/74 PB
[58] Field of Search ............ 24/16 PB, 17 AP, 17 A, 24/30.5 P, 206 A, 208 A, 214, 297; 248/74 PB, 71, 73; 292/321, 322

[56] References Cited

U.S. PATENT DOCUMENTS

| 3,163,712 | 12/1964 | Cochran | 248/74 PB |
| 3,515,363 | 6/1970 | Fisher | 248/74 PB |
| 3,516,631 | 6/1970 | Santucci | 24/16 PB |
| 3,529,795 | 9/1970 | VanNiel | 24/16 PB |
| 3,542,321 | 11/1970 | Kahabka | 24/16 PB |
| 3,637,177 | 1/1972 | Santucci | 248/74 PB |
| 3,672,615 | 6/1972 | Fiorentino | 248/74 PB |
| 3,847,331 | 11/1974 | Vallinotto et al. | 248/74 PB |
| 3,942,750 | 3/1976 | Noorily | 248/74 PB |
| 4,061,299 | 12/1977 | Kurosaki | 248/74 PB |
| 4,312,614 | 1/1982 | Palmer et al. | 24/297 |
| 4,317,262 | 3/1982 | Wells, Jr. | 24/17 AP |

FOREIGN PATENT DOCUMENTS 2362931 6/1974 Fed. Rep. of Germany ... 24/16 PB
2442414 3/1976 Fed. Rep. of Germany ... 248/74 PB

*Primary Examiner*—John J. Wilson
*Attorney, Agent, or Firm*—Oblon, Fisher, Spivak, McClelland & Maier

[57] ABSTRACT

A clamp for a bundle of cables has a resilient plastic base (11), a C-shaped resilient arm (12) integrally formed with the surface of the base and having a clamp operating portion (13) projecting outward, a guide portion (21) provided around an escape hole (17) on the base (11) so as to oppose to and meet with a free end (14) of the C-shaped resilient arm, and an engaging portion (23) provided opposite to the guide portion (21) with an inserting groove (22) therebetween and having an inclined surface (24) supported by a thin support wall (26), a claw part (25) connected to the lower end of the inclined surface and a release operating portion (27) projecting outward, the C-shaped resilient arm (12) being provided with a plurality of ratchet-shaped projections (16) in tiers on the outer surface near the free end (14) except both edges (15) thereof, the clamp being adapted for guiding the free end (14) into the inserting groove (22) by the inclined wall (18) of the guide portion (21) and the inclined surface (24) of the engaging portion (23), engaging the claw part (25) of the engaging portion (23) with an appropriate one among the plurality of projections (16) and holding both edges (15) of the free end (14) securely in both forward and backward and right and left directions by the side walls (19) (20) of the guide portion (21).

4 Claims, 6 Drawing Figures

4,439,896

CLAMP FOR A BUNDLE OF CABLES

TECHNICAL FIELD

This invention relates to a clamp for a bundle of cables for fixing such a bundle of cables after wiring to a chassis, a panel etc.

BACKGROUND ART

Conventionally, a clamp for a bundle of cables typically had a structure, such as, for example, that shown in FIG. 1, in which a C-shaped resilient arm (2) is formed integrally on a highly resilient plastic base (1), a clamp operating portion (3) is projectingly provided at or near the center of said resilient arm (2) and a hook-shaped engaging projection (5) at its free end (4), and there are provided at the position on the base (1) opposite to the free end (4) a retaining portion (7) and an engaging portion (10) consisting of an engaging claw (8) and a release operating portion (9) with an inserting groove (6) therebetween, and this is adapted for fixing the bundle of cables by inserting said bundle of cables between the resilient arm (2) and the base (1), then pushing down the clamp operating portion (3) and pushing the free end (4) into the inserting groove (6) while bending the engaging portion (10) outward to widen the space, and engaging the hook-shaped engaging projection (5) with the engaging claw (8), and in turn adapted for releasing the thus fixed bundle of cables by pushing down the release operation portion (9) in such way as to extend the inserting groove (6) thereby removing the hook-shaped engaging projection (5) from the engaging claw (8).

However, such a conventional clamp for a bundle of cables had disadvantages. First of all, once the bundle of cables has been inserted between the resilient arm (2) and the base (1), a repulsion force of the bundle of cables is generated to push away the resilient arm (2) outward and therefore a simple operation to push down the clamp operating portion (3) cannot provide a proper position for the free end (4) to be inserted into the inserting groove (6) and thus it is necessary to guide it with fingers, and moreover even after having been properly located, since the hook-shaped engaging dent (5) pushes away the engaging portion (10) outward and thus imposes a great load, insertion is difficult. In addition, after the bundle of cables has been fixed, since the repulsion force of the resilient arm (2) and the repulsion force of the bundle of cables itself are imposed on the engaging portion (10) and therefore it is necessary for the engaging portion (10) to have adequate strength in the outward direction, there has been a disadvantage that the force required to release the release operating portion (9) is inevitably increased as the result. Further, there has been another disadvantage that since the resilient arm (2) after having been fixed is not restricted in the transverse direction, i.e., the direction indicated by the arrow in the figure, if the resilient arm (2) receives some force in the direction indicated by the arrow in the figure by, for example, movement of the bundle of cables or the like, the free end (4) will move and slip away, thereby easily releasing the fixing. Still further, there has also been a disadvantage that since the space formed between the base (1) and the C-shaped resilient arm (2) is constantly the same, this cannot be adjusted to meet the change in diameter of the bundle of cables.

DISCLOSURE OF THE INVENTION

The present invention is a clamp for a bundle of cables which comprises a resilient plastic base, a C-shaped resilient arm integrally formed with the surface of the base, a guide portion provided on the base so as to oppose and meet with a free end of the C-shaped resilient arm, and an engaging portion provided opposite to the guide portion and having an inclined surface supported by a thin support wall, a claw part connected to the lower end of the inclined surface and a release operating portion projecting outward, the C-shaped resilient arm being provided with a plurality of ratchet-shaped projections in tiers on the outer surface near the free end except both edges thereof, and which is adapted for guiding the free end into the inserting groove by the inclined wall of the guide portion and the inclined surface of the engaging portion, engaging the claw part of the engaging portion with an appropriate one among the plurality of projections and holding both edges of the free end securely in both forward and backward and right and left directions by the side walls of the guide portion; and according to this, merely by pressing down the clamp operating portion, the free end of the C-shaped resilient arm is led to the position to be inserted, and thus the necessity to guide the free end with fingers is eliminated, and further since the engaging portion is made thinner at its support wall portion to reduce the extending force of the claw part in the outward direction, the projections of the resilient arm can be smoothly engaged with a small pressing force, thereby making the clamping operation extremely easy.

In addition, the repulsion force of the resilient arm or the repulsion force of the bundle of cables itself is only applied to the guide portion but not to the engaging portion, and therefore the engaging portion only has to withstand the load in the vertical direction, the mechanical strength of the engaging portion can be lowered to the minimum required level, thereby reducing the operating force for releasing the clamp.

Further, even if a load is applied to the resilient arm in either forward or backward or right or left direction by, for example, movement of the bundle of cables after fixing, since the free end is securely held by the guide portion, the fixing is secured.

Still further, it is possible to adjust the length of the resilient arm by engaging an appropriate one among the plurality of projections with the engaging portion, reliable fixing is secured by responding to the change in diameter of the bundle of cables.

BRIEF DESCRIPTION OF THE DRAWING

FIG. 2 through FIG. 4 are those showing a first embodiment of this invention, in which FIG. 2 is its perspective view, FIG. 3 is its vertical cross-sectional view and FIG. 4 is its enlarged perspective view showing the pertinent parts;

BEST MODE OF CARRYING OUT THE INVENTION

The present invention is more particularly described with reference to the attached drawing.

Figure 1:
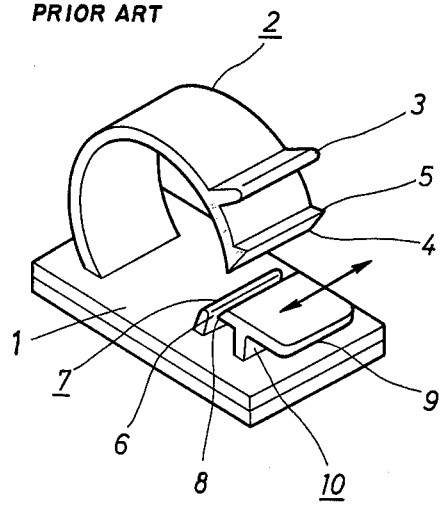
FIG. 1 is a perspective view showing the conventional embodiment.
Figure 2:
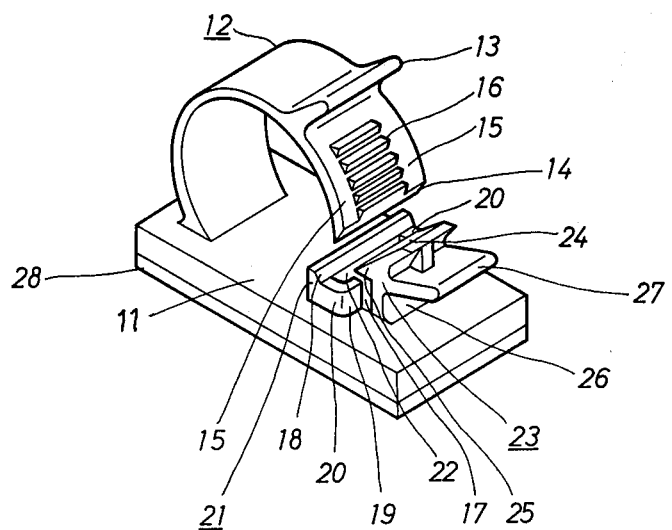
Figure 3:
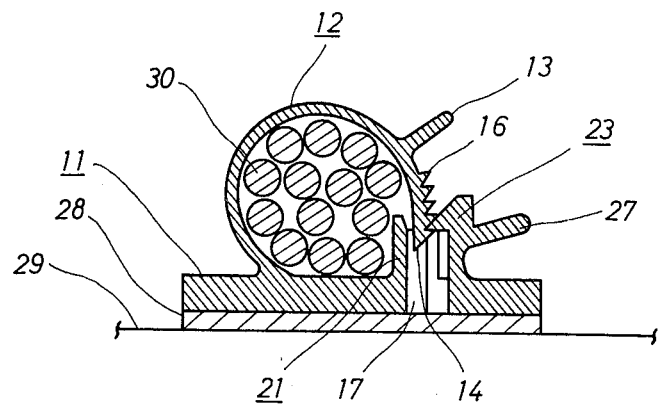
Figure 4:
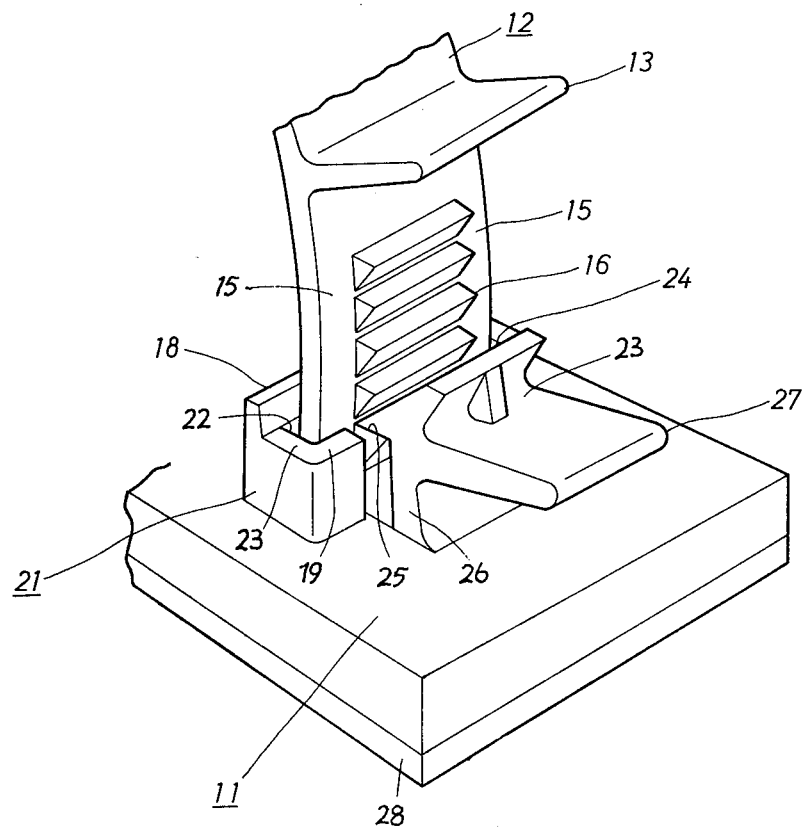

FIG. 2 through FIG. 4 show a first embodiment of the present invention, in which an appropriately C-shaped resilient arm (12) is integrally formed on a base (11) made of a highly resilient plastic such as nylon etc., and at or near the center of the resilient arm (12), a clamp operating portion (13) is provided so as to project outward, thereby making a free end (14) capable of being opened and closed, and at the same time a plurality of ratchet-shaped projections (16) are formed in tiers at the central part on the outer surface of the resilient arm (12) from the free end (14) upward while leaving both edges (15) thereof free of projections. Further, around an escape hole (17) located on the base (11) at the position opposite to the free end (14) of the resilient arm (12), there is provided a guide portion (21) which consists of an inclined wall (18), side walls (19), both in parallel with the free end (14), and another set of side walls (20) connecting these. An engaging portion (23) is provided opposite to the guide portion (21) with an inserting groove (22) therebetween, the inserting groove being surrounded by the guide portion (21) and connected to the escape hole (17) of the base (11). The engaging portion (23) comprises an inclined surface (24), a claw part (25) provided at the lower end of the inclined surface (24), a support wall (26) which supports (24) and (25) on the base (11), and a release operating portion (27) projecting opposite to the claw part (25), and at the same time the body part of the support wall (26) is made thin enough to be flexible and therefore, on pressing down the release operating portion (27), the support wall (26) bends to permit the claw part (25) to move backward to widen the inserting groove (22). Further, an adhesive tape (28) is applied to the rear surface of the base (11), and by the adhesive tape (28), the base (11) can be fitted to an even surface of e.g. a chassis of an electric appliance etc.

For fixing the bundle of cables (30) using the clamp for a bundle of cables according to the present invention which is of the construction described above, the clamp operating portion (13) of the C-shaped resilient arm (12) is lifted to widely open, and the bundle of cables (30) is then inserted between the resilient arm (12) and the base (11), after which the free end (14) is pressed down so that the free end (14) is guided by the inclined wall (18) of the guide portion (21) and the inclined surface (24) of the engaging portion (23) smoothly into the inside of the inserting groove (22) and at the same time the engaging portion (23) bends backward to widen the inserting groove (22), and after passing the apex of the ratchet-shaped projections (16), the engaging portion (23) returns, and, as shown in FIG. 3 and FIG. 4, the claw part (25) of the engaging portion (23) bites into the upper surface of a projection (16) so that the free end (14) of the resilient arm (12) is engaged, and thus the bundle of cables (3) is fixed. On the other hand, for releasing this fixing, the release operating portion (27) of the engaging portion (23) is pressed down so that the engaging portion (23) bends to remove the projections (16) of the resilient arm (12) from the claw part (25) thereby releasing the resilient arm (12).

In this connection, where the resilient arm (12) is engaged, since both edges (15) of the free end (14) of the resilient arm (12) are securely retained in both forward and backward and right and left directions by the inclined wall (18) and the side walls (19) and (20), the load generated in such directions by the repulsion force of the bundle of cables (30) itself or the load imposed upon the bundle of cables (30) can be entirely held by the guide portion (21), and therefore the engagement of the resilient arm (12) is protected against slip-off and at the same time since the claw part (25) of the engaging portion (23) does not need to withstand any load but that in the upward direction, the engaging portion (23) can be made so as to have a reduced mechanical strength, and thus the body part of the support wall (26) of the engaging portion (23) can be made thinner without causing any trouble, thereby permitting to greatly reduce the force necessary for the release operation. Further, since the plurality of projection (16) are provided in tiers on the resilient arm (12), it is possible to adjust the engaging length of the resilient arm (12) according to the outer diameter of the bundle of cables to be fixed.

Figure 5:
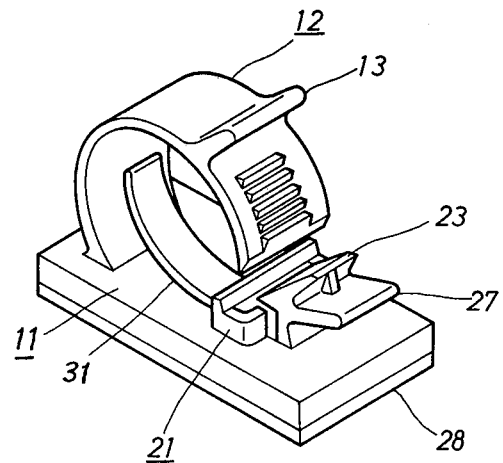
FIG. 5 is a perspective view showing a second embodiment of this invention.

FIG. 5 shows the second embodiment of this invention, in which case the basic construction is the same as that of the above-described first embodiment, except that there is provided, at the position adjacent to the guide portion (21) on the base (11), a curved auxiliary resilient arm (31) opposite to the inner surface of the C-shaped resilient arm (12) so as to clamp and fix a bundle of cables between the auxiliary resilient arm (31) and the above-mentioned C-shaped resilient arm (12), and by this construction, it is possible to firmly fix a bundle of cables having such small diameter as would not permit the bundle to be fixed by the C-shaped resilient arm (12) even by adjusting to the shortest length in the first embodiment.

Figure 6:
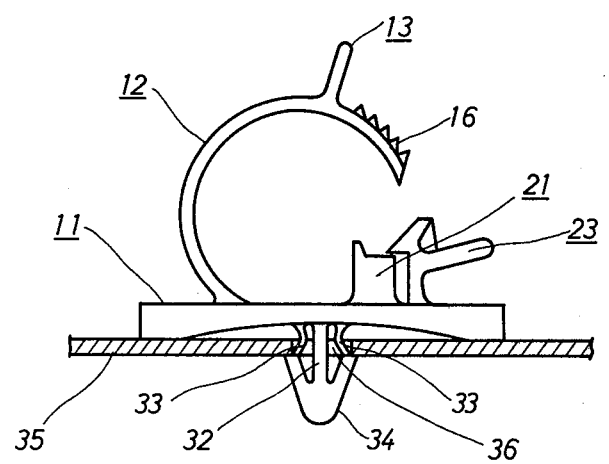
FIG. 6 is a front view showing a third embodiment of this invention.

FIG. 6 shows the third embodiment of this invention, in which case the basic construction is the same as that of the above-described first or second embodiment, except that instead of the adhesive tape (28) applied to the rear surface of the base (11) in the above-described first or second example, there is integrally provided on the above-mentioned base (11) an arrowhead-shaped resilient connecting portion (34) having therebetween a joint plate (32) at the central part and curved thin joint portions (33) at the right and left ends, and by this construction, the arrowhead-shaped resilient connecting portion (34) can be pushed into a fitting hole (36) of e.g. a chassis (35), thereby fitting the base (11) in a moment. In this connection, as illustrated in FIG. 6, it is preferred that the rear surface of the base (11) is made a little thinner at the central part so as to resiliently clamp the chassis (35) with the end part of the resilient connecting portion (34) and the base (11).

INDUSTRIAL APPLICABILITY

As described above, the clamp for a bundle of cables according to the present invention is suitable for fixing the already wired bundle of cables to chassis, panels, bodies etc. in the inside of a switch, various machines, vehicles etc.

I claim:

1. A clamp for a bundle of cables, comprising:
   a resilient plastic base;
   an escape hole formed in said base;
   a guide portion extending from said base adjacent said escape hole, said guide portion having a first upstanding inclined wall at one side of said escape hole, a pair of second upstanding walls at a side of said escape hole opposite said one side and a pair of upstanding third side walls connecting said first and second walls, whereby said guide portion surrounds said escape hole and defines a portion of an inserting groove leading to said escape hole;

an engaging portion fixed to said base, said engaging portion including a support wall connected to said base, a claw connected to said support wall and being positioned between said second walls of said guide portion so as to define the remainder of said support groove, an inclined surface connected to said claw, and a release operating portion projecting from said support wall;

a C-shaped resilient arm having a first end integrally formed with said base and a free end constructed so as to be insertable in said inserting groove and said escape hole, said free end including a plurality of ratchet shaped projections formed on a central portion thereof, said projections being mutually spaced along a line connecting said ends of said resilient arm, whereby said inclined wall of said guide portion and said inclined surface of said engaging portion guide said free end of said resilient arm into said inserting groove, whereby engagement of said claw with said projections retains said resilient arm in said escape hole, whereby said second walls of said guide portion abut portions of said free end not including said projections so as to support and secure said free end in said escape hole, and whereby said third walls laterally retain said free end of said resilient arm.

2. The clamp for a bundle of cables according to claim 1 in which a curved auxiliary resilient arm is provided opposite to the inner surface of the C-shaped resilient arm so as to clamp the bundle of cables between said auxiliary resilient arm and the C-shaped resilient arm.

3. The clamp for a bundle of cables according to claim 1 or 2 in which an adhesive tape is applied to a surface of the base opposite said resilient arm so that the base can be fixed to an even surface by said adhesive tape.

4. The clamp for a bundle of cables according to claim 1 or 2 in which there is integrally provided on a surface of the base opposite said resilient arm, an arrowhead-shaped resilient connecting portion having a joint plate at the central part and lateral thin joint portions, said resilient connecting portion being adapted for fitting the base to a chassis by pushing said resilient connecting portion into a fitting hole of said chassis.

* * * * *